US007637824B2

(12) United States Patent
Shindo et al.

(10) Patent No.: US 7,637,824 B2
(45) Date of Patent: Dec. 29, 2009

(54) GOLF BALL

(75) Inventors: Jun Shindo, Chichibu (JP); Eiji Takehana, Chichibu (JP); Kae Yamazaki, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 73 days.

(21) Appl. No.: 11/878,942

(22) Filed: Jul. 27, 2007

(65) Prior Publication Data

US 2008/0076601 A1    Mar. 27, 2008

Related U.S. Application Data

(63) Continuation-in-part of application No. 11/324,297, filed on Jan. 4, 2006, now Pat. No. 7,294,067.

(30) Foreign Application Priority Data

Jul. 2, 2007    (JP)    ............................. 2007-173990

(51) Int. Cl.
    *A63B 37/00*    (2006.01)
(52) U.S. Cl. .................................... 473/351
(58) Field of Classification Search .............. 473/351, 473/367, 368
    See application file for complete search history.

(56) References Cited

U.S. PATENT DOCUMENTS

| 6,184,276 | B1 |  | 2/2001 | Ignatz-Hoover |
| 6,194,505 | B1 | * | 2/2001 | Sone et al. ................... 524/432 |
| 6,277,924 | B1 |  | 8/2001 | Hamada et al. |
| 6,372,847 | B1 |  | 4/2002 | Wouters |
| 6,596,801 | B2 | * | 7/2003 | Higuchi et al. ............... 524/432 |
| 6,602,941 | B2 |  | 8/2003 | Higuchi et al. |
| 6,634,961 | B2 |  | 10/2003 | Higuchi et al. |
| 6,695,716 | B2 |  | 2/2004 | Higuchi et al. |
| 6,712,715 | B2 |  | 3/2004 | Higuchi et al. |
| 6,786,836 | B2 |  | 9/2004 | Higuchi et al. |
| 6,795,172 | B2 |  | 9/2004 | Putman et al. |
| 6,818,705 | B2 |  | 11/2004 | Wu et al. |
| 6,841,642 | B2 |  | 1/2005 | Kaszas |
| 6,921,345 | B2 |  | 7/2005 | Higuchi et al. |
| 6,923,735 | B1 |  | 8/2005 | Hayashi |
| 7,250,010 | B1 | * | 7/2007 | Shindo et al. ................ 473/351 |
| 7,294,067 | B2 | * | 11/2007 | Shindo et al. ................ 473/351 |
| 2003/0134954 | A1 | * | 7/2003 | Takesue et al. .............. 524/394 |
| 2004/0147694 | A1 |  | 7/2004 | Sone et al. |
| 2005/0148723 | A1 |  | 7/2005 | Kondou |

FOREIGN PATENT DOCUMENTS

| JP | 7-268132 A | 10/1995 |
| JP | 11-35633 A | 2/1999 |
| JP | 2002-355336 A | 12/2002 |
| JP | 2002-355337 A | 12/2002 |
| JP | 2002-355338 A | 12/2002 |
| JP | 2002-355339 A | 12/2002 |
| JP | 2002-355340 A | 12/2002 |
| JP | 2002-356581 A | 12/2002 |
| JP | 2004-292667 A | 10/2004 |
| WO | WO 2003/082925 | 10/2003 |

OTHER PUBLICATIONS

"Report of Research & Development", Fine Chemical, vol. 23, No. 9, p. 5-15 (1994).
"Hydrolysis of Tri-tert-butylaluminum" by Mason et al., J. American Chemical Society, vol. 115, pp. 4971-4984 (1993).
"Three-Coordinate Aluminum Is Not a Prerequisite for Catalytic Activity in the Zirconocene-Alumoxane Polymerization of Ethylene", by Harlen et al, J. American Chemical Society, vol. 117, pp. 6465-6474, (1995).

* cited by examiner

*Primary Examiner*—Raeann Trimiew
(74) *Attorney, Agent, or Firm*—Sughrue Mion, PLLC

(57) ABSTRACT

The present invention provides a golf ball having a core and a cover of one or more layer, wherein the core is made of a material obtained by molding under heat a rubber composition which includes (a) a base rubber containing polybutadiene having a stress relaxation time ($T_{80}$) of 3.5 or less, (b) an unsaturated carboxylic acid and/or a metal salt thereof, and (c) an organic peroxide, and wherein at least one layer of the cover is made of a material obtained by molding a mixture containing as the essential ingredients (A) a metal ion neutralized olefin-unsaturated carboxylic acid random copolymer having a Shore D hardness of at least 60, (B) an unsaturated fatty acid, and (C) a basic inorganic metal compound capable of neutralizing acid groups in components A and B. The golf ball has a good rebound, a good feel on impact, and excellent scuff resistance.

9 Claims, No Drawings

GOLF BALL

CROSS-REFERENCE TO RELATED APPLICATION

This application is a continuation-in-part of copending application Ser. No. 11/324,297 filed on Jan. 4, 2006, the entire contents of which are hereby incorporated by reference.

This application claims priority under 35 U.S.C. §119(a) on Patent Application No. 2007-173990 filed in Japan on Jul. 2, 2007, the entire contents of which are hereby incorporated by reference.

BACKGROUND OF THE INVENTION

The present invention relates to a golf ball having an excellent rebound.

Efforts to confer golf balls with an excellent rebound have until now focused on and attempted to optimize one or more indicator of the polybutadiene used as the base rubber, such as the Mooney viscosity, polymerization catalyst, solvent viscosity and molecular weight distribution. See, for example, Patent Document 1: JP-A 2004-292667; Patent Document 2: U.S. Pat. No. 6,818,705; Patent Document 3: JP-A 2002-355336; Patent Document 4: JP-A 2002-355337; Patent Document 5: JP-A 2002-355338; Patent Document 6: JP-A 2002-355339; Patent Document 7: JP-A 2002-355340; and Patent Document 8: JP-A 2002-356581.

For example, Patent Document 1 (JP-A 2004-292667) describes, as a base rubber for golf balls, a polybutadiene having a Mooney viscosity of 30 to 42 and a molecular weight distribution (Mw/Mn) of 2.5 to 3.8. Patent Document 2 (U.S. Pat. No. 6,818,705) describes, for the same purpose, a polybutadiene having a molecular weight of at least 200,000 and a resilience index of at least 40.

However, because many golfers desire golf balls capable of traveling a longer distance, there exists a need for the development of golf balls having an even better rebound.

Patent Document 1: JP-A 2004-292667
Patent Document 2: U.S. Pat. No. 6,818,705
Patent Document 3: JP-A 2002-355336
Patent Document 4: JP-A 2002-355337
Patent Document 5: JP-A 2002-355338
Patent Document 6: JP-A 2002-355339
Patent Document 7: JP-A 2002-355340
Patent Document 8: JP-A 2002-356581

SUMMARY OF THE INVENTION

It is therefore an object of the present invention to provide a golf ball having an excellent rebound.

As a result of extensive investigations, the inventor has discovered that, in a golf ball composed of a core and a cover of one or more layers, by having the core made of a material obtained by molding under heat a rubber composition which includes a base rubber containing a polybutadiene having a specific $T_{80}$ value, an unsaturated carboxylic acid and/or a metal salt thereof, and an organic peroxide, and by having at least one layer of the cover made of a material obtained by mixing in specific proportions and molding (A) a metal ion-neutralized olefin-unsaturated carboxylic acid random copolymer having a Shore D hardness of at least 60, (B) an unsaturated fatty acid and (C) a basic inorganic metal compound capable of neutralizing acid groups in foregoing components A and B, a good ball rebound is maintained. The golf ball of the invention has also been found to have a good feel on impact and an excellent scuff resistance.

Accordingly, the invention provides the following golf balls.

[1] A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide, and wherein at least one layer of the cover is made of a material obtained by molding a mixture comprising:
  (A) 100 parts by weight of a metal ion-neutralized olefin-unsaturated carboxylic acid random copolymer having a Shore D hardness of at least 60;
  (B) 5 to 60 parts by weight of an unsaturated fatty acid; and
  (C) 1 to 10 parts by weight of a basic inorganic metal compound capable of neutralizing acid groups in components A and B.

[2] The golf ball of [1], wherein the rubber composition further comprises (d) an organosulfur compound.

[3] The golf ball of [1], wherein the polybutadiene having a stress relaxation time ($T_{80}$) of 3.5 or less accounts for at least 40 wt % of the base rubber.

[4] The golf ball of [1], wherein the polybutadiene having a stress relaxation time ($T_{80}$) of 3.5 or less is a polybutadiene prepared using a rare-earth catalyst.

[5] The golf ball of [1], wherein the polybutadiene having a stress relaxation time ($T_{80}$) of 3.5 or less is a polybutadiene prepared by polymerization using a rare-earth catalyst, followed by terminal modification.

[6] The golf ball of [1], wherein an outermost layer of the cover is made of the material obtained by molding the mixture of components A to C.

[7] The golf ball of [1], wherein the mixture has a melt mass flow rate of at least 2.0 g/10 min.

[8] The golf ball of [1], wherein the unsaturated fatty acid serving as component B is at least one selected from the group consisting of oleic acid, elaidic acid, erucic acid, linoleic acid and linolenic acid.

[9] The golf ball of [1], wherein the basic inorganic metal compound serving as component C is calcium hydroxide.

DETAILED DESCRIPTION OF THE INVENTION

The invention is described more fully below.

The golf ball of the invention has a core and a cover of one or more layer. The core is not limited to only one layer, and may if necessary be composed of two or more layers. The core is made of a material obtained by molding under heat a rubber composition which includes the following components (a) to (c):

(a) a base rubber containing polybutadiene having a stress relaxation time ($T_{80}$), as defined below, of 3.5 or less,
(b) an unsaturated carboxylic acid and/or a metal salt thereof, and
(c) an organic peroxide.

The stress relaxation time ($T_{80}$) is the time in seconds, from the moment when rotor rotation is stopped immediately after measurement of the $ML_{1+4}$ (100° C.) value (the Mooney viscosity measured at 100° C. in accordance with ASTM D-1646-96), that is required for the $ML_{1+4}$ value to decrease 80%.

The term "Mooney viscosity" used herein refers to an industrial indicator of viscosity as measured with a Mooney viscometer, which is a type of rotary plastometer. The unit symbol used is $ML_{1+4}$ (100° C.), where "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

In the practice of the invention, the polybutadiene in above component (a) includes a polybutadiene having a stress relaxation time ($T_{80}$) of 3.5 or less (which polybutadiene is sometimes abbreviated below as "BR1"). The $T_{80}$ value is preferably 3.0 or less, more preferably 2.8 or less, and even more preferably 2.5 or less. The $T_{80}$ value has a lower limit of preferably 1 or more, and more preferably 1.5 or more. At a $T_{80}$ value of more than 3.5, the objects of the invention cannot be attained. On the other hand, if the $T_{80}$ value is too small, problems may arise with workability.

The foregoing polybutadiene BR1 has a Mooney viscosity ($ML_{1+4}$ (100° C.)) which, while not subject to any particular limitation, is preferably at least 20 but not more than 80.

It is recommended that the above polybutadiene BR1 have a cis-1,4 bond content of preferably 60%, more preferably at least 80%, even more preferably at least 90%, and most preferably at least 95%, and a 1,2-vinyl bond content of preferably at most 2%, more preferably at most 1.7%, even more preferably at most 1.5%, and most preferably at most 1.3%. At a cis-1,4 bond content or a 1,2-vinyl bond content outside of these ranges, the rebound may decrease.

From the standpoint of rebound, it is preferable for the above polybutadiene BR1 used in the invention to be a polybutadiene synthesized using a rare-earth catalyst.

A known rare-earth catalyst may be used for this purpose. Exemplary rare-earth catalysts include those made up of a combination of a lanthanide series rare-earth compound, an organoaluminum compound, an alumoxane, a halogen-bearing compound, and an optional Lewis base.

Examples of suitable lanthanide series rare-earth compounds include halides, carboxylates, alcoholates, thioalcoholates and amides of atomic number 57 to 71 metals.

Organoaluminum compounds that may be used include those of the formula $AlR^1R^2R^3$ (wherein $R^1$, $R^2$ and $R^3$ are each independently a hydrogen or a hydrocarbon group of 1 to 8 carbons).

Preferred alumoxanes include compounds of the structures shown in formulas (I) and (II) below. The alumoxane association complexes described in Fine Chemical 23, No. 9, 5 (1994), J. Am. Chem. Soc. 115, 4971 (1993), and J. Am. Chem. Soc. 117, 6465 (1995) are also acceptable.

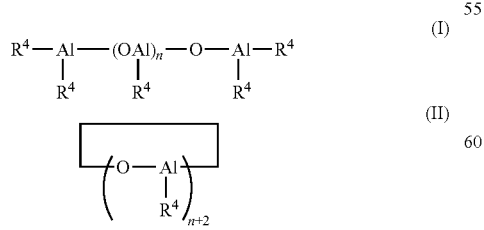

In the above formulas, $R^4$ is a hydrocarbon group having 1 to 20 carbon atoms, and n is 2 or a larger integer.

Examples of halogen-bearing compounds that may be used include aluminum halides of the formula $AlX_nR_{3-n}$ (wherein X is a halogen; R is a hydrocarbon group of 1 to 20 carbons, such as an alkyl, aryl or aralkyl; and n is 1, 1.5, 2 or 3); strontium halides such as $Me_3SrCl$, $Me_2SrCl_2$, $MeSrHCl_2$ and $MeSrCl_3$; and other metal halides such as silicon tetrachloride, tin tetrachloride and titanium tetrachloride.

The Lewis base can be used to form a complex with the lanthanide series rare-earth compound. Illustrative examples include acetylacetone and ketone alcohols.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Preferred examples of such rare-earth catalysts include those mentioned in JP-A 11-35633.

The polymerization of butadiene in the presence of a rare-earth catalyst may be carried out by bulk polymerization or vapor phase polymerization, either with or without the use of solvent, and at a polymerization temperature in a range of preferably from −30 to +150° C., and more preferably from 10 to 100° C.

To manufacture golf balls of stable quality, it is desirable for the above-described polybutadiene BR1 used in the invention to be a terminal-modified polybutadiene obtained by polymerization using the above-described rare-earth catalyst, followed by the reaction of a terminal modifier with active end groups on the polymer.

A known terminal modifier may be used for this purpose. Illustrative examples include compounds of types (1) to (6) below.

(1) Halogenated organometallic compounds, halogenated metallic compounds and organometallic compounds of the general formulas $R^5{}_nM'X_{4-n}$, $M'X_4$, $M'X_3$, $R^5{}_nM'$ (—$R^6$—$COOR^7$)$_{4-n}$ or $R^5{}_nM'$ (—$R^6$—$COR^7$)$_{4-n}$ (wherein $R^5$ and $R^6$ are each independently a hydrocarbon group of 1 to 20 carbons; $R^7$ is a hydrocarbon group of 1 to 20 carbons which may contain pendant carbonyl or ester groups; M' is a tin, silicon, germanium or phosphorus atom; X is a halogen atom; and n is an integer from 0 to 3);

(2) heterocumulene compounds having on the molecule a Y=C=Z linkage (wherein Y is a carbon, oxygen, nitrogen or sulfur atom; and Z is an oxygen, nitrogen or sulfur atom);

(3) three-membered heterocyclic compounds containing on the molecule the following bonds

(wherein Y is an oxygen, nitrogen or sulfur atom);

(4) halogenated isocyano compounds;

(5) carboxylic acids, acid halides, ester compounds, carbonate compounds and acid anhydrides of the formula $R^8$—(COOH)$_m$, $R^9$(COX)$_m$, $R^{10}$—(COO—$R^{11}$), $R^{12}$—OCOO—$R^{13}$, $R^{14}$—(COOCO—$R^{15}$)$_m$ or

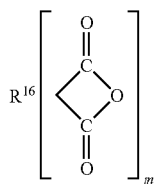

(wherein $R^8$ to $R^{16}$ are each independently a hydrocarbon group of 1 to 50 carbons, X is a halogen atom, and m is an integer from 1 to 5); and (6) carboxylic acid metal salts of the formula $R^{17}{}_1 M''$ $(OCOR^{18})_{4-1}$, $R^{19}{}_1 M''$ $(OCO-R^{20}-COOR^{21})_{4-1}$ or

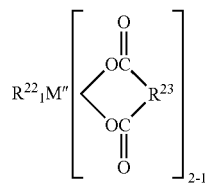

(wherein $R^{17}$ to $R^{23}$ are each independently a hydrocarbon group of 1 to 20 carbons, M" is a tin, silicon or germanium atom, and the letter l is an integer from 0 to 3).

Specific examples of the above terminal modifiers (1) to (6) and methods for their reaction are described in, for example, JP-A 11-35633 and JP-A 7-268132.

In the practice of the invention, the above-described polybutadiene BR1 is included within the base rubber and accounts for preferably at least 40 wt %, more preferably at least 50 wt %, even more preferably at least 60 wt %, and even up to 100 wt %, of the base rubber. If this proportion is too low, the rebound may decrease.

No particular limitation is imposed on rubber compounds other than BR1 which may be included in the base rubber. For example, polybutadiene rubbers having a stress relaxation time $T_{80}$ of more than 3.5 may be included, as can also other rubber compounds such as styrene-butadiene rubbers (SBR), natural rubbers, polyisoprene rubbers and ethylene-propylene-diene rubbers (EPDM). These may be used individually or as combinations of two or more thereof.

The Mooney viscosity of such additional rubbers included in the base rubber, while not subject to any particular limitation, is preferably at least 20 but preferably not more than 80.

Rubbers synthesized with a group VIII catalyst may be used as such additional rubbers included in the base rubber. Exemplary group VIII catalysts include the following nickel catalysts and cobalt catalysts.

Examples of suitable nickel catalysts include single-component systems such as nickel-kieselguhr, binary systems such as Raney nickel/titanium tetrachloride, and ternary systems such as nickel compound/organometallic compound/boron trifluoride etherate. Exemplary nickel compounds include reduced nickel on a carrier, Raney nickel, nickel oxide, nickel carboxylate and organonickel complex salts. Exemplary organometallic compounds include trialkylaluminum compounds such as triethylaluminum, tri-n-propylaluminum, triisobutylaluminum and tri-n-hexylaluminum; alkyllithium compounds such as n-butyllithium, sec-butyllithium, tert-butyllithium and 1,4-dilithiumbutane; and dialkylzinc compounds such as diethylzinc and dibutylzinc.

Examples of suitable cobalt catalysts include cobalt and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite and cobalt dinitrosyl chloride. It is particularly advantageous to use these compounds in combination with, for example, a dialkylaluminum monochloride such as diethylaluminum monochloride or diisobutylaluminum monochloride; a trialkylaluminum such as triethylaluminum, tri-n-propylaluminum, triisobutylaluminum or tri-n-hexylaluminum; an alkylaluminum sesquichloride such as ethylaluminum sesquichloride; or aluminum chloride.

Polymerization using the above group VIII catalysts, and particularly a nickel or cobalt catalyst, can be carried out by a process in which, typically, the catalyst is continuously charged into a reactor together with a solvent and butadiene monomer, and the reaction conditions are suitably selected, such as a reaction temperature in a range of 5 to 60° C. and a reaction pressure in a range of atmospheric pressure to 70 plus atmospheres, so as to yield a product having the above-indicated Mooney viscosity.

Above component (b) may be an unsaturated carboxylic acid, specific examples of which include acrylic acid, methacrylic acid, maleic acid and fumaric acid. Acrylic acid and methacrylic acid are especially preferred. Alternatively, it may be the metal salt of an unsaturated carboxylic acid, examples of which include the zinc and magnesium salts of unsaturated fatty acids such as zinc dimethacrylate and zinc diacrylate. The use of zinc diacrylate is especially preferred.

It is recommended that the content of above component (b) per 100 parts by weight of the base rubber be preferably at least 10 parts by weight, and more preferably at least 15 parts by weight, but preferably not more than 60 parts by weight, more preferably not more than 50 parts by weight, even more preferably not more than 45 parts by weight, and most preferably not more than 40 parts by weight. Too much component (b) will make the material molded under heat from the rubber composition too hard, giving the golf ball an unpleasant feel on impact. On the other hand, too little will result in a lower rebound.

Above component (c) may be a commercially available product, suitable examples of which include Percumyl D (produced by NOF Corporation), Perhexa 3C (NOF Corporation) and Luperco 231XL (Atochem Co.). If necessary, a combination of two or more different organic peroxides may be used.

It is recommended that the amount of component (c) per 100 parts by weight of the base rubber be preferably at least 0.1 part by weight, and more preferably at least 0.3 part by weight, but preferably not more than 5 parts by weight, more preferably not more than 4 parts by weight, even more preferably not more than 3 parts by weight, and most preferably not more than 2 parts by weight. Too much or too little component (c) may make it impossible to obtain a suitable hardness distribution, resulting in a poor feel on impact, durability and rebound.

To further improve rebound, it is desirable for the rubber composition in the invention to include also the following component (d):

(d) an organosulfur compound.

Examples of such organosulfur compounds include thiophenols, thionaphthols, halogenated thiophenols, and metal salts thereof. Specific examples include the zinc salts of pentachlorothiophenol, pentafluorothiophenol, pentabromothiophenol and p-chlorothiophenol; and diphenylpolysulfides, dibenzylpolysulfides, dibenzoylpolysulfides, dibenzothiazoylpolysulfides and dithiobenzoylpolysulfides having 2 to 4 sulfurs. These may be used singly or as combinations of two or more thereof. Diphenyldisulfide and/or the zinc salt of pentachlorothiophenol are especially preferred.

It is recommended that the amount of component (d) included per 100 parts by weight of the base rubber be preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. Too much organosulfur compound may make the material molded under heat from the rubber composition too soft, whereas too little may make an improved rebound difficult to achieve.

The rubber composition in the invention may additionally include such additives as inorganic fillers and antioxidants. Illustrative examples of suitable inorganic fillers include zinc oxide, barium sulfate and calcium carbonate. The amount included per 100 parts by weight of the base rubber is preferably at least 5 parts by weight, more preferably at least 7 parts by weight, even more preferably at least 10 parts by weight, and most preferably at least 13 parts by weight, but preferably not more than 80 parts by weight, more preferably not more than 50 parts by weight, even more preferably not more than 45 parts by weight, and most preferably not more than 40 parts by weight. Too much or too little inorganic filler may make it impossible to obtain a proper golf ball weight and a suitable rebound.

To increase the rebound, it is desirable for the inorganic filler to include zinc oxide in an amount of at least 50 wt %, preferably at least 75 wt %, and most preferably 100 wt % (where the zinc oxide accounts for 100% of the inorganic filler).

The zinc oxide has an average particle size (by air permeametry) of preferably at least 0.01 µm, more preferably at least 0.05 µm, and most preferably at least 0.1 µm, but preferably not more than 2 µm, and more preferably not more than 1 µm.

Examples of suitable commercial antioxidants include 2,2'-methylenebis(4-methyl-6-t-butylphenol) (Nocrac NS-6, available from Ouchi Shinko Chemical Industry Co., Ltd.) and 2,2'-methylenebis(4-ethyl-6-t-butylphenol) (Nocrac NS-5, Ouchi Shinko Chemical Industry Co., Ltd.). To achieve a good rebound and durability, it is recommended that the amount of antioxidant included per 100 parts by weight of the base rubber be preferably more than 0 part by weight, more preferably at least 0.05 part by weight, even more preferably at least 0.1 part by weight, and most preferably at least 0.2 part by weight, but preferably not more than 3 parts by weight, more preferably not more than 2 parts by weight, even more preferably not more than 1 part by weight, and most preferably not more than 0.5 part by weight.

The material molded under heat from the rubber composition in the present invention can be obtained by vulcanizing and curing the rubber composition using a method of the same sort as that used on prior-art rubber compositions for golf balls. Vulcanization may be carried, for example, at a temperature of from 100 to 200° C. for a period of 10 to 40 minutes.

It is recommended that the core (hot-molded material) in the invention have a hardness difference, obtained by subtracting the JIS-C hardness at the center of the hot-molded material from the JIS-C hardness at the surface of the material, of preferably at least 15, more preferably at least 16, even more preferably at least 17, and most preferably at least 18, but preferably not more than 50, and more preferably not more than 40. Setting the hardness within this range is desirable for achieving a golf ball having a soft feel and a good rebound and durability.

It is also recommended that the core (hot-molded material) in the invention have a deflection, when compressed under a final load of 1275 N (130 kgf) from an initial load of 98 N (10 kgf), of preferably at least 2.0 mm, more preferably at least 2.5 mm, and even more preferably at least 2.8 mm, but preferably not more than 6.0 mm, more preferably not more than 5.5 mm, even more preferably not more than 5.0 mm, and most preferably not more than 4.5 mm. Too small a deflection may worsen the feel of the ball on impact and, particularly on long shots such as with a driver in which the ball incurs a large deformation, may subject the ball to an excessive rise in spin, shortening the distance traveled by the ball. On the other hand, a hot-molded material that is too soft may deaden the feel of the golf ball when played and compromise the rebound of the ball, resulting in a shorter distance, and may give the ball a poor durability to cracking with repeated impact.

It is recommended that the core have a diameter of preferably at least 30.0 mm, more preferably at least 32.0 mm, even more preferably at least 35.0 mm, and most preferably at least 37.0 mm, but preferably not more than 41.0 mm, more preferably not more than 40.5 mm, even more preferably not more than 40.0 mm, and most preferably not more than 39.5 mm.

In particular, it is recommended that such a solid core in a solid two-piece golf ball have a diameter of preferably at least 37.0 mm, more preferably at least 37.5 mm, even more preferably at least 38.0 mm, and most preferably at least 38.5 mm, but preferably not more than 41.0 mm, more preferably not more than 40.5 mm, and even more preferably not more than 40.0 mm.

Similarly, it is recommended that such a solid core in a solid three-piece golf ball have a diameter of preferably at least 30.0 mm, more preferably at least 32.0 mm, even more preferably at least 34.0 mm, and most preferably at least 35.0 mm, but preferably not more than 40.0 mm, more preferably not more than 39.5 mm, and even more preferably not more than 39.0 mm.

It is also recommended that the core have a specific gravity of preferably at least 0.9, more preferably at least 1.0, and even more preferably at least 1.1, but preferably not more than 1.4, more preferably not more than 1.3, and even more preferably not more than 1.2.

Next, in the present invention, at least one layer of the cover of one or more layers is made of a material obtained by molding a mixture composed of the following essential ingredients:

(A) 100 parts by weight of a metal ion-neutralized olefin-unsaturated carboxylic acid random copolymer;

(B) 5 to 60 parts by weight of an unsaturated fatty acid; and (C) 1 to 10 parts by weight of a basic inorganic metal compound capable of neutralizing acid groups in components A and B.

The olefin in component A is generally one having at least 2 carbons, but not more than 8 carbons, and preferably not more than 6 carbons. Illustrative examples include ethylene, propylene, butene, pentene, hexene, heptene and octene. Ethylene is especially preferred.

Examples of the unsaturated carboxylic acid include acrylic acid, methacrylic acid, maleic acid and fumaric acid. Acrylic acid and methacrylic acid are preferred.

The random copolymer of the random copolymer metal salt used as component A may be obtained by random copolymerization of the above-mentioned ingredients according to a known method. It is recommended that the content of unsaturated carboxylic acid (acid content) included in the random copolymer be preferably at least 2 wt %, more preferably at least 6 wt %, and even more preferably at least 8 wt %, but preferably not more than 25 wt %, more preferably not more than 20 wt %, and even more preferably not more than 15 wt %. If the acid content is too low, the rebound resilience may decrease. On the other hand, if the acid content is too high, the processability may decrease.

The metal ion-neutralized random copolymer used as component A may be obtained by neutralizing some of the acid groups on the random copolymer with metal ions. Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred, and $Zn^{++}$ is especially recommended. The degree to which the random copolymer is neutralized by these metal ions is not subject to any particular limitation. The neutralization product may be obtained by a known method, such as one that involves introducing to the random copolymer a suitable compound, examples of which include formates, acetates, nitrates, carbonates, bicarbonates, oxides, hydroxides and alkoxides of the above metal ions.

In the inventive golf ball, a binary polymer which is a metal ion neutralization product of an olefin-unsaturated carboxylic acid random copolymer is used in this way as component A. The reason is that, while using the subsequently described unsaturated fatty acid with the above-described metal ion-neutralized binary copolymer serving as component A is essential for imparting the inventive ball with a soft feel and an excellent scuff resistance, a binary polymer better plasticizes the overall cover material than does a ternary polymer, enabling a good moldability to be maintained.

It is critical that the metal ion-neutralized olefin-unsaturated carboxylic acid random copolymer serving as component A have a Shore D hardness of preferably at least 60, more preferably at least 61, and even more preferably at least 62. Given that component A serves as the base resin of the cover material and that the material hardness of the base resin is largely responsible for the hardness, durability and scuff resistance of the ball, it is essential to set the Shore D hardness of component A within the foregoing range.

Illustrative examples of the metal salt of a random copolymer serving as component A include Himilan 1605, Himilan 1706, Himilan AM7317, Himilan AM7318 and Himilan AM7315 (all products of DuPont-Mitsui Polychemicals Co., Ltd.), and Surlyn 7930, Surlyn 8150, Surlyn 8220 and Surlyn 9150 (all products of E.I. DuPont de Nemours & Co.).

In the invention, the unsaturated fatty acid used as component B generally has one or more double bond on the molecule. Illustrative examples include those having one double bond, such as oleic acid (18 carbons), elaidic acid (the trans isomer of oleic acid) and erucic acid (22 carbons); those having two double bonds, such as linoleic acid (18 carbons); and those having three double bonds, such as linolenic acid (18 carbons). These fatty acids may be used singly or as combinations of two or more. The use of oleic acid is especially preferred.

Above component B is included in an amount, per 100 parts by weight of component A, of at least 5 parts by weight, preferably at least 8 parts by weight, and more preferably at least 10 parts by weight. Use in a smaller amount may make it impossible to lower the hardness of the ionomer resin to the desired level. The upper limit in the amount of component B is 60 parts by weight or less, preferably 50 parts by weight or less, and more preferably 40 parts by weight or less. At an amount greater than this upper limit, uptake by the resin becomes difficult and bleeding tends to arise.

The golf ball material of the invention includes as component C a basic inorganic metal compound capable of neutralizing acid groups on above components A and B. It neutralizes un-neutralized carboxyl groups within the ionomer resin and carboxyl groups in component B, thereby forming a metal salt. This results in strong crosslinkages, enhancing the scuff resistance.

In the golf ball of the invention, as noted above, an unsaturated fatty acid is included as component B. The amount of component B is relatively small, which should help avoid problems such as molding defects.

The reason for using an unsaturated fatty acid having one or more double bond on the molecule is that such fatty acids exhibit a much larger ionomer resin hardness-lowering effect than saturated fatty acids having no double bonds (e.g., stearic acid (18 carbons)).

Component C of the invention is a basic inorganic metal compound capable of neutralizing acid groups in above components A and B, thus enabling the rebound resilience and processability to be freely controlled.

Illustrative examples of the metal ions used in the basic inorganic metal compound include $Li^+$, $Na^+$, $K^+$, $Ca^{++}$, $Mg^{++}$, $Zn^{++}$, $Al^{+++}$, $Ni^+$, $Fe^{++}$, $Fe^{+++}$, $Cu^{++}$, $Mn^{++}$, $Sn^{++}$, $Pb^{++}$ and $Co^{++}$. Basic inorganic fillers containing these metal ions may be used as the inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. The use of calcium hydroxide, which has a high reactivity with the ionomer resin, is especially preferred.

Above component C is included in an amount, per 100 parts by weight of component A, of at least 1 part by weight, preferably at least 1.2 parts by weight, and more preferably at least 1.5 parts by weight. Below this amount, the degree of neutralization falls short and a sufficient rebound resilience cannot be achieved. The upper limit in the amount of component C per 100 parts by weight of component A is not more than 10 parts by weight, preferably not more than 7 parts by weight, and more preferably not more than 6 parts by weight.

Other materials may be suitably included in the mixture of components A to C, although it is recommended that the mixture have a melt mass flow rate (measured in accordance with JIS-K7210 at a test temperature of 190° C. and under a test load of 21 N (2.16 kgf)) of preferably at least 2.0 g/10 min, and more preferably at least 2.5 g/10 min, but preferably not more than 6 g/10 min, and more preferably not more than 5 g/10 min. If the melt mass flow rate of the hot mixture is too low, the processability will markedly decline.

Various additives may be optionally included in the mixture. For example, when the mixture is to be used as a cover material, additives such as pigments, dispersants, antioxidants, ultraviolet absorbers and light stabilizers may be included therein. Moreover, to improve the feel of the ball on impact, in addition to the essential ingredients described above, various non-ionomeric thermoplastic elastomers may be included in the material of the invention. Examples of such non-ionomeric thermoplastic elastomers include olefin elastomers, styrene elastomers, ester elastomers, and urethane elastomers. The use of olefin elastomers and styrene elastomers is especially preferred.

The mixing method used to obtain the above mixture is not subject to any particular limitation. For example, mixture may be carried out at a heating temperature of from 150 to 250° C. using as the mixing apparatus an internal mixer such as a kneading-type twin-screw extruder, a Banbury mixer or a kneader. No limitation is place on the method of incorporating the various additives other than above essential ingredients A to C. Examples include a method in which the additives are compounded with the above essential ingredients and simultaneously mixed under applied heat, and a method in which the essential ingredients are first mixed under heating, then the optional additives are added, followed by additional mixing under applied heat. In particular, when a co-rotating twin-screw extruder is used, the unsaturated fatty acid may be injected from various vent ports on the twin-screw extruder using a plunger-type pump. The basic inorganic metal compound may be added from any desired point using a side feed.

To obtain the cover in the invention, use may be made of a method which involves placing within a mold a single-layer core or a multi-layer core of two or more layers that has been pre-fabricated according to the type of ball, mixing and melting the above mixture under applied heat, and injection-molding the molten mixture so as to encase the core within the desired cover. In this way, the cover-forming operation can be carried out in a state that ensures an outstanding heat stability, flow and moldability, enabling the golf ball ultimately obtained to have a high rebound and also a good feel on impact and excellent scuff resistance. Alternatively, the method used to form the cover may be one in which first a pair of hemispherical half-cups is molded from the cover material of the invention, following which the half-cups are placed over a core and molded under pressure at 120 to 170° C. for 1 to 5 minutes.

In the practice of the invention, the cover is not limited to one layer only, and may instead be formed with a multilayer structure of two or more layers. If the cover has one layer, the thickness is preferably from 0.5 to 3 mm. If the cover has two layers, it is preferable for the outer cover layer to have a thickness in a range of 0.5 to 2.0 mm and for the inner cover layer to have a thickness in a range of 0.5 to 2.0 mm. When the cover has a multilayer structure, the cover material of the invention may be used either at the inner side of the multilayer structure or in the outermost layer cover. However, in the present invention, use as the outermost layer is preferred. That is, when the cover is formed of two or more layers, to obtain a good feel and to make the scuff resistance even better, it is advantageous for a molded material obtained from the mixture containing above components A to C to be used as the chief material of the outermost layer.

With regard to the cover hardness, it is desirable for the respective layers making up the cover (cover layers) to have a Shore D hardness of at least 40, and preferably at least 45, but not more than 60, and preferably not more than 58.

The surface of the outermost layer of the cover may have a plurality of dimples formed thereon, and the cover may be administered various treatment, such as surface preparation, stamping and painting. In particular, the ease of operation involved in administering such surface treatment to a golf ball cover made of the cover material of the invention can be improved on account of the good moldability of the cover surface.

The present invention provides a golf ball in which a material obtained by molding the above mixture is used in at least one cover layer. The type of golf ball is not subject to any particular limitation, provided the ball has a core and at least one cover layer. Exemplary golf balls include solid golf balls, such as two-piece golf balls having a solid core encased by a cover and multi-piece golf balls with three or more layers (e.g., three-piece solid golf balls); and thread-wound golf balls having a thread-wound core encased by a cover of one layer or having a multilayer structure of two or more layers.

The golf ball of the invention, which can be manufactured so as to conform with the Rules of Golf for competitive play, may be produced to a ball diameter of not less than 42.67 mm and a weight of not more than 45.93 g. The golf ball of the invention may be suitably used in all competitive play, whether by amateur golfers having a head speed of 30 to 40 m/s or by professional golfers having a head speed of 45 m/s.

The golf ball of the invention uses as the core a material of exceptional resilience that has been molded under heat from a rubber composition, as a result of which the ball as a whole has an excellent rebound. Moreover, the golf ball of the invention also has a good feel on impact and excellent scuff resistance while retaining a good flight performance.

EXAMPLES

The following Examples and Comparative Examples are provided by way of illustration and not by way of limitation.

Examples 1 to 6, Comparative Examples 1 to 8

Using a core material composed primarily of the polybutadiene shown in Table 1 below, a solid core having a diameter of 35.3 mm, a weight of 27.1 g, and a deflection adjusted to 4.1 mm or 4.2 mm was produced. The deflection was the measured amount of deformation by the core when compressed under a final load of 1,275 N (130 kgf) from an initial load of 98 N (10 kgf).

TABLE 1

| | | Core No. | | | |
|---|---|---|---|---|---|
| | | No. 1 | No. 2 | No. 3 | No. 4 |
| Formulation (pbw) | Polybutadiene EC140 | 100 | | | |
| | Polybutadiene BR51 | | 100 | | |
| | Polybutadiene BR60 | | | 100 | |
| | Polybutadiene BR01 | | | | 100 |
| | Peroxide | 0.8 | 0.8 | 0.8 | 0.8 |
| | Zinc oxide | 5 | 5 | 5 | 5 |
| | Antioxidant | 0.2 | 0.2 | 0.2 | 0.2 |
| | Zinc diacrylate | 24 | 24 | 24 | 24 |
| | Zinc salt of pentachlorothiophenol | 0.1 | 0.1 | 0.1 | 0.1 |
| | Barium sulfate | 20.8 | 20.8 | 20.8 | 20.8 |
| Properties | Diameter (mm) | 35.3 | 35.3 | 35.3 | 35.3 |
| | Weight (g) | 27.1 | 27.1 | 27.1 | 27.1 |
| | Deflection (mm) | 4.1 | 4.1 | 4.1 | 4.2 |

Details of the above formulation are provided below.
Polybutadiene rubber:
  "EC140" (trade name), available from Firestone Polymers. Polymerized with a neodymium catalyst; Mooney viscosity, 43; $T_{80}$ value, 2.3.
Polybutadiene rubber:
  "BR51" (trade name), available from JSR Corporation. Polymerized with a neodymium catalyst; Mooney viscosity, 39; $T_{80}$ value, 5.0.
Polybutadiene rubber:
  "BR60" (trade name), available from Polimeri Srl. Polymerized with a neodymium catalyst; Mooney viscosity, 57; $T_{80}$ value, 4.6.
Polybutadiene rubber:
  "BR01" (trade name), available from JSR Corporation. Polymerized with a nickel catalyst; Mooney viscosity, 48; $T_{80}$ value, 8.4.
Peroxide: Dicumyl peroxide, available from NOF Corporation under the trade name "Percumyl D".
Zinc oxide: Available from Sakai Chemical Industry Co., Ltd. under the trade name "Sanshu Sanka Aen"; average particle size, 0.6 μm (air permeametry).

Antioxidant: "Nocrac NS-6" (trade name), available from Ouchi Shinko Chemical Industry Co., Ltd.
Zinc diacrylate: Available from Nippon Shokubai Co., Ltd.
Barium sulfate: "Barico #100" (trade name), available from Hakusui Tech Co., Ltd.

Next, an intermediate layer (inner cover layer) material of the composition shown in Table 2 was injection-molded to a thickness of 1.65 mm in a mold within which the above solid core (cores No. 1 to No. 4) had been placed. The cover material was then mixed in a co-rotating twin-screw extruder (screw diameter, 32 mm; L/D=32; motor capacity, 7.5 kw; with vacuum vent) at 200° C.; the resulting mixture was injected into a mold within which the intermediate layer material-encased core had been placed, and injection-molded to a cover thickness of 2.05 mm, thereby producing a three-piece solid golf ball having a diameter of 42.7 mm. The surface of the golf ball obtained in each example was coated with a non-yellowing urethane resin-based paint. The properties (initial velocity, feel on impact, scuff resistance, etc.) of the golf balls obtained in each example were evaluated as described below. The results are presented in Tables 2 and 3.

TABLE 2

| | | | Example | | | | | |
|---|---|---|---|---|---|---|---|---|
| | | | 1 | 2 | 3 | 4 | 5 | 6 |
| Core | Type | | No. 1 | No. 1 | No. 1 | No. 1 | No. 1 | No. 1 |
| Intermediate layer formulation (pbw) | Hytrel 4047 | | 100 | 100 | 100 | 100 | 100 | 100 |
| Intermediate layer properties | Material hardness (Shore D) | | 40 | 40 | 40 | 40 | 40 | 40 |
| | Specific gravity | | 1.12 | 1.12 | 1.12 | 1.12 | 1.12 | 1.12 |
| Sphere composed of core encased by intermediate layer | Outside diameter (mm) | | 38.6 | 38.6 | 38.6 | 38.6 | 38.6 | 38.6 |
| Cover formulation (pbw) | Component A | Himilan 1706 | 100 | 100 | 100 | | | |
| | | Himilan 1605 | | | | 100 | 100 | 100 |
| | | Himilan 1601 | | | | | | |
| | | Himilan 1557 | | | | | | |
| | Component B | Oleic acid | 20 | 30 | 40 | 20 | 30 | 40 |
| | Component C | Calcium hydroxide | 1.83 | 3.41 | 5.2 | 3.03 | 4.92 | 5 |
| | Titanium dioxide | | 4 | 4 | 4 | 4 | 4 | 4 |
| | Magnesium stearate | | | | | | | |
| | Blue pigment | | 0.05 | 0.05 | 0.05 | 0.05 | 0.05 | 0.05 |
| Cover properties | Melt mass flow rate (g/10 min) | | 4.0 | 4.3 | 5.9 | 3.8 | 4.8 | 6.9 |
| | Cover hardness (Shore D) | | 50 | 50 | 46 | 58 | 56 | 54 |
| | Specific gravity | | 1.00 | 1.00 | 0.99 | 0.98 | 0.97 | 0.99 |
| Ball properties | Diameter (mm) | | 42.7 | 42.7 | 42.7 | 42.7 | 42.7 | 42.7 |
| | Weight (g) | | 45.4 | 45.4 | 45.4 | 45.3 | 45.1 | 45.4 |
| | Deflection (mm) | | 3.5 | 3.5 | 3.5 | 3.3 | 3.3 | 3.4 |
| | Initial velocity (m/s) | | 76.2 | 76.4 | 76.5 | 77.2 | 77.2 | 77 |
| | Scuff resistance (rating) | | 4.4 | 4.4 | 4.3 | 4.3 | 4.2 | 4.1 |
| | Feel on impact | | good | good | good | good | good | good |

TABLE 3

| | | Comparative Example | | | | | | | |
|---|---|---|---|---|---|---|---|---|---|
| | | 1 | 2 | 3 | 4 | 5 | 6 | 7 | 8 |
| Core | Type | No. 1 | No. 1 | No. 1 | No. 1 | No. 2 | No. 3 | No. 4 | No. 4 |
| Intermediate layer formulation (pbw) | Hytrel 4047 | 100 | 100 | 100 | 100 | 100 | 100 | 100 | 100 |
| Intermediate layer properties | Material hardness (Shore D) | 40 | 40 | 40 | 40 | 40 | 40 | 40 | 40 |
| | Specific gravity | 1.12 | 1.12 | 1.12 | 1.12 | 1.12 | 1.12 | 1.12 | 1.12 |
| Sphere composed of core encased by intermediate layer | Outside diameter (mm) | 38.6 | 38.6 | 38.6 | 38.6 | 38.6 | 38.6 | 38.6 | 38.6 |

TABLE 3-continued

|  |  |  | Comparative Example | | | | | | | |
|---|---|---|---|---|---|---|---|---|---|---|
|  |  |  | 1 | 2 | 3 | 4 | 5 | 6 | 7 | 8 |
| Cover formulation (pbw) | Component A | Himilan 1706 | 100 |  | 50 |  | 100 | 100 | 100 | 100 |
|  |  | Himilan 1605 |  | 100 | 50 |  |  |  |  |  |
|  |  | Himilan 1601 |  |  |  | 50 |  |  |  |  |
|  |  | Himilan 1557 |  |  |  | 50 |  |  |  |  |
|  | Component B | Oleic acid |  |  |  |  | 30 | 30 | 30 |  |
|  | Component C | Calcium hydroxide |  |  |  |  | 3.41 | 3.41 | 3.41 |  |
|  |  | Titanium dioxide | 4 | 4 | 4 | 4 | 4 | 4 | 4 | 4 |
|  |  | Magnesium stearate | 2 | 2 | 2 | 2 |  |  |  | 2 |
|  |  | Blue pigment | 0.05 | 0.05 | 0.05 | 0.05 | 0.05 | 0.05 | 0.05 | 0.05 |
| Cover properties | Melt mass flow rate (g/10 min) |  | 1.3 | 2.9 | 1.7 | 2.1 | 4.3 | 4.3 | 4.3 | 1.3 |
|  | Cover hardness (Shore D) |  | 62 | 63 | 63 | 60 | 50 | 50 | 50 | 62 |
|  | Specific gravity |  | 0.99 | 0.97 | 0.98 | 0.97 | 1.00 | 1.00 | 1.00 | 0.99 |
| Ball properties | Diameter (mm) |  | 42.7 | 42.7 | 42.7 | 42.7 | 42.7 | 42.7 | 42.7 | 42.7 |
|  | Weight (g) |  | 45.3 | 45.1 | 45.2 | 45.1 | 45.4 | 45.4 | 45.4 | 45.3 |
|  | Deflection (mm) |  | 3.2 | 3.1 | 3.1 | 3.3 | 3.5 | 3.5 | 3.6 | 3.3 |
|  | Initial velocity (m/s) |  | 77 | 77.4 | 77.6 | 77.1 | 76.2 | 76.2 | 76 | 76.6 |
|  | Scuff resistance (rating) |  | 4.6 | 4.1 | 4.2 | 3.7 | 4.4 | 4.4 | 4.4 | 4.6 |
|  | Feel on impact |  | NG | NG | NG | NG | good | good | good | NG |

Details of the above formulation are provided below.

(I) Hytrel 4047 (trade name): Thermoplastic polyether ester elastomer available from DuPont-Toray Co., Ltd. (Shore D hardness, 40).

(II) Himilan 1706 (trade name): Ionomer resin of ethylene-methacrylic acid copolymer neutralized with zinc ions, available from DuPont-Mitsui Polychemicals Co., Ltd. (Shore D hardness, 64).

(III) Himilan 1605 (trade name): Ionomer resin of ethylene-methacrylic acid copolymer neutralized with sodium ions, available from DuPont-Mitsui Polychemicals Co., Ltd. (Shore D hardness, 65).

(IV) Himilan 1601 (trade name): Ionomer resin of ethylene-methacrylic acid copolymer neutralized with sodium ions, available from DuPont-Mitsui Polychemicals Co., Ltd. (Shore D hardness, 59).

(V) Himilan 1557 (trade name): Ionomer resin of ethylene-methacrylic acid copolymer neutralized with zinc ions, available from DuPont-Mitsui Polychemicals Co., Ltd. (Shore D hardness, 59).

(VI) Oleic acid: NAA-300 (trade name), available from NOF Corporation.

(VII) Magnesium stearate: Nissan Magnesium Stearate (trade name), available from NOF Corporation.

(VIII) Titanium oxide: Tipaque R550 (trade name), available from Ishihara Sangyo Kaisha, Ltd.

(IX) Blue pigment: Ultramarine Blue EP-62 (trade name), available from Holliday Pigments.

(X) Calcium hydroxide: CLS-B (trade name), available from Shiraishi Kogyo.

[Evaluation of Cover Material Properties]

Melt Mass Flow Rate

The melt mass flow rate (or melt index) of the material, as measured in accordance with JIS-K7210 (test temperature, 190° C.; test load, 21 N (2.16 kgf).

Material Hardnesses of Intermediate Layer and Cover Resin

The Shore D hardnesses measured according to ASTM D-2240 are shown.

[Evaluation of Ball Properties]

Ball Deflection (mm)

The amount of deformation (mm) by the golf ball when compressed under a final load of 1,275 N (130 kgf) from an initial load state of 98 N (10 kgf) was determined.

Initial Velocity of Ball (m/s)

The initial velocity (m/s) was measured using an initial velocity measuring apparatus of the same type as that of the official golf ball regulating-body—R&A (USGA), and in accordance with R&A (USGA) rules.

Feel on Impact

Sensory evaluations were carried out with a panel of ten amateur golfers having head speeds of 35 to 40 m/s and using W#1 clubs. Ratings were based on the following criteria.

Good: At least 7 of the 10 golfers thought the ball had a good feel.

Fair: Five or six of the 10 golfers thought the ball had a good feel.

Poor: Four or fewer of the 10 golfers thought the ball had a good feel.

Scuff Resistance

A non-plated X-WEDGE 03 (loft, 52°) manufactured by Bridgestone Sports Co., Ltd. was set in a swing robot, and the ball was hit at a head speed of 33 m/s with the club face open about 30° from square. The surface state of the ball was then visually examined by three golfers having handicaps of 10 or less, and rated according to the following criteria. The average of the ratings obtained for each example is shown in the table.

5: Surface of ball is either completely unchanged or bears a slight imprint from club face.

4: Surface of ball bears a clear imprint from club face, but is not frayed.

3: Surface is conspicuously frayed and scuffed.

2: Surface is frayed and cracked.

1: Some dimples have been obliterated.

It is apparent from the results in Tables 2 and 3 that the golf balls obtained in Examples 1 to 6 according to the invention had excellent rebound resilience, scuff resistance and feel on impact. By contrast, the balls obtained in Comparative Examples 1 to 8 had a poor feel and showed no improvement in scuff resistance.

The invention claimed is:

1. A golf ball comprising a core and a cover of one or more layer, wherein the core is made of a material obtained by molding under heat a rubber composition comprising (a) a base rubber containing polybutadiene having a stress relaxation time ($T_{80}$), defined as the time in seconds from the moment when rotation is stopped immediately after measurement of the $ML_{1+4}$ (100° C.) value (the Mooney viscosity measured at 100° C. in accordance with ASTM D-1646-96) that is required for the $ML_{1+4}$ value to decrease 80%, of 3.5 or less, (b) an unsaturated carboxylic acid and/or a metal salt thereof, and (c) an organic peroxide, and wherein at least one layer of the cover is made of a material obtained by molding a mixture comprising:
   (A) 100 parts by weight of a metal ion-neutralized olefin-unsaturated carboxylic acid random copolymer having a Shore D hardness of at least 60;
   (B) 5 to 60 parts by weight of an unsaturated fatty acid; and
   (C) 1 to 10 parts by weight of a basic inorganic metal compound capable of neutralizing acid groups in components A and B.

2. The golf ball of claim 1, wherein the rubber composition further comprises (d) an organosulfur compound.

3. The golf ball of claim 1, wherein the polybutadiene having a stress relaxation time ($T_{80}$) of 3.5 or less accounts for at least 40 wt % of the base rubber.

4. The golf ball of claim 1, wherein the polybutadiene having a stress relaxation time ($T_{80}$) of 3.5 or less is a polybutadiene prepared using a rare-earth catalyst.

5. The golf ball of claim 1, wherein the polybutadiene having a stress relaxation time ($T_{80}$) of 3.5 or less is a polybutadiene prepared by polymerization using a rare-earth catalyst, followed by terminal modification.

6. The golf ball of claim 1, wherein an outermost layer of the cover is made of the material obtained by molding the mixture of components A to C.

7. The golf ball of claim 1, wherein the mixture has a melt mass flow rate of at least 2.0 g/10 min.

8. The golf ball of claim 1, wherein the unsaturated fatty acid serving as component B is at least one selected from the group consisting of oleic acid, elaidic acid, erucic acid, linoleic acid and linolenic acid.

9. The golf ball of claim 1, wherein the basic inorganic metal compound serving as component C is calcium hydroxide.

* * * * *